United States Patent [19]

Hirata et al.

[11] Patent Number: 5,531,394
[45] Date of Patent: Jul. 2, 1996

[54] MAGNETIC TAPE CASSETTE HAVING VARIABLE FORCE REEL PRESSING DEVICE

[75] Inventors: Hidetoshi Hirata; Shingo Katagiri, both of Kanagawa, Japan

[73] Assignee: Fuji Photo Film Co., Ltd., Kanagawa, Japan

[21] Appl. No.: 932,547

[22] Filed: Aug. 20, 1992

[30] Foreign Application Priority Data

Aug. 23, 1991 [JP] Japan ................. 3-074278 U

[51] Int. Cl.⁶ .......................... G11B 23/087
[52] U.S. Cl. .................... 242/345.2; 360/132
[58] Field of Search ................. 242/197, 198, 242/199, 345.2, 348; 360/132; 352/78 R; 354/275

[56] References Cited

U.S. PATENT DOCUMENTS

| | | | |
|---|---|---|---|
| 3,804,351 | 4/1974 | Kaneko | 242/199 |
| 4,436,256 | 3/1984 | Saitou | 242/200 |
| 4,802,044 | 1/1989 | Iwahashi et al. | 242/199 x |
| 4,899,243 | 2/1990 | Bordignon | 242/199 X |
| 4,946,148 | 8/1990 | Kim | 267/158 |
| 5,094,434 | 3/1992 | Ryu | 242/199 X |
| 5,114,092 | 5/1992 | Gelardi et al. | 242/199 |
| 5,195,696 | 3/1993 | KeeDong | 242/199 |
| 5,216,563 | 6/1993 | Lee | 242/199 X |
| 5,240,201 | 8/1993 | Gelardi et al. | 242/199 |
| 5,263,659 | 11/1993 | Carroll | 242/199 |
| 5,297,753 | 3/1994 | Abe | 242/345.2 X |

FOREIGN PATENT DOCUMENTS

| | | |
|---|---|---|
| 0030367 | 12/1980 | European Pat. Off. . |
| 0152693 | 12/1984 | European Pat. Off. . |
| 3137889 | 9/1980 | Germany . |
| 2137165 | 3/1983 | United Kingdom . |
| 2162494 | 2/1986 | United Kingdom . |

OTHER PUBLICATIONS

European Search Report.

*Primary Examiner*—John Q. Nguyen
*Attorney, Agent, or Firm*—Sughrue, Mion, Zinn, Macpeak & Seas

[57] ABSTRACT

A magnetic tape cassette includes a leaf spring and magnetic tape reels in which the depression force of the leaf spring is varied such that, in assembling the cassette, the leaf spring provides a relatively weak depression force thereby to facilitate cassette assembly, and when the cassette is in use, the leaf spring provides a relatively strong depression force to sufficiently depress the magnetic tape reels. The magnetic tape cassette also includes a pair of protrusions formed on the inner surface of the top wall of an upper half casing which can abut the arms of a leaf spring secured to the upper half casing, so that, in assembling the cassette, the leaf spring is bent until it is brought into contact with the protrusions. When the cassette is in use, the leaf spring is further bent with the protrusions serving as fulcra, thereby to increase its force of depression.

13 Claims, 6 Drawing Sheets

MAGNETIC TAPE CASSETTE HAVING VARIABLE FORCE REEL PRESSING DEVICE

BACKGROUND OF THE INVENTION

This invention relates to magnetic tape cassettes, and more particularly to a magnetic tape cassette which includes a cassette casing having an upper half casing and a lower half casing and which incorporates a pair of tape winding members and a leaf spring depressing the tape winding members downwardly in the casing.

Audio or video devices employ magnetic tape cassettes for recording and reproducing signals in which a pair of tape winding structures (hereinafter referred to as winding reels), on which a magnetic tape has been wound are rotatably supported.

Magnetic tape cassettes for a VHS system video tape recorder (VTR), a Beta format system VTR, or an 8-mm VTR are designed as follows. A pair of tape winding reels formed of synthetic resin such as ABS and on which a magnetic tape has been wound are rotatably supported in a cassette casing formed by an upper half casing and a lower half casing. In the cassette casing, the tape winding reels are pushed downwardly by a leaf spring which is secured to the upper half casing.

Figure 10:
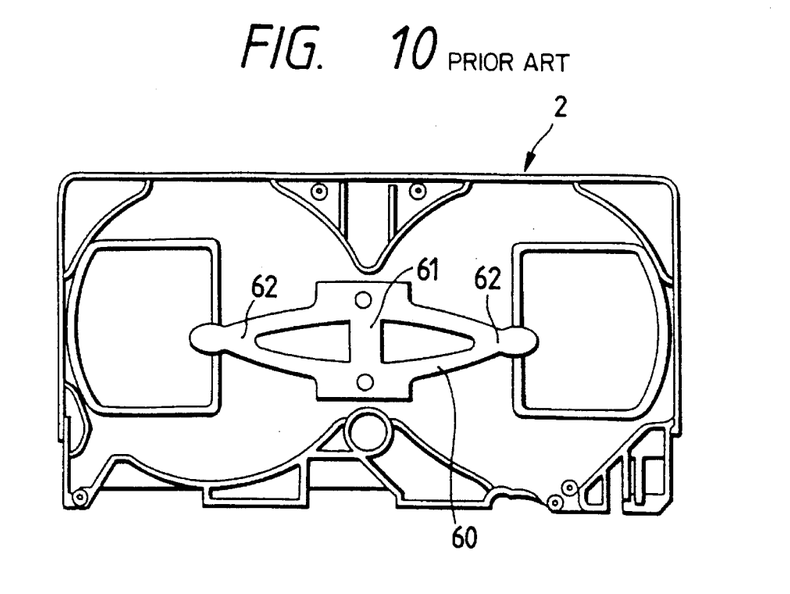
FIG. 10 is a plan view showing the upper half casing of a conventional magnetic tape cassette.
Figure 11:
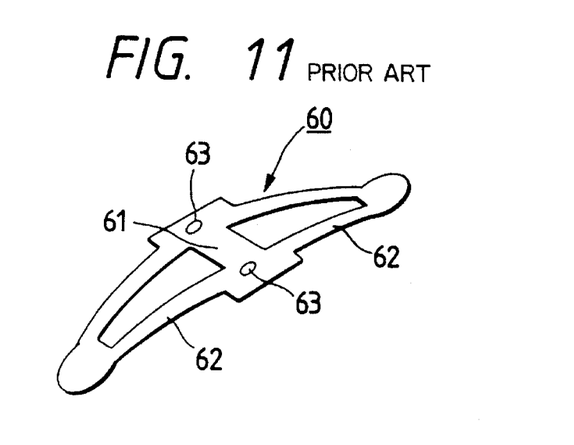
FIG. 11 is a perspective view of a leaf spring in the conventional magnetic tape cassette shown in FIG. 10.

FIG. 10 is a plan view showing the interior of the upper half casing of a conventional magnetic tape cassette for a VHS system VTR, and FIG. 11 is a perspective view of a leaf spring in the cassette.

As shown in FIG. 10, the leaf spring 60 is made of a metal plate. That is, the leaf spring includes a middle portion, namely, a fixing portion 61, and right and left arms 62 which extend from the fixing portion 61 to the right and left and which are suitably curved. The fixing portion 61, as shown in FIG. 11, has holes 63. The holes 63 are engaged, for instance, with protrusions formed on the inner surface of the upper half casing at the center thereof. The ends of the protrusions are fused by ultrasonic welding, so that the leaf spring 60 is secured to the upper half casing with its right and left arms 62 extending towards the lower half casing.

Thus, when the magnetic tape cassette has been assembled, the leaf spring 60 pushes the central portions of the upper surfaces of the tape winding reels towards the lower half casing through the end portions of the right and left arms 62.

The leaf spring 60 thus secured is made of an elastic metal plate, as was described above. On the other hand, to reduce the manufacturing cost of the leaf spring, or to facilitate the machining operation thereof, an extremely thin plate is usually employed in manufacturing the leaf spring. Hence, since a thinner metal plate is used, the resultant leaf spring has a correspondingly decreased spring pressure. However, the decrease in spring pressure is compensated for by increasing the deflection of the leaf spring.

However, in assembling the cassette, the leaf spring thus increased in deflection is liable to spring up out of the cassette because of its elasticity. Thus, as discussed in greater detail below, it is difficult to handle the leaf spring.

Generally, the magnetic tape cassette is assembled as follows. First, the upper half casing, to which the leaf spring has been secured, is temporarily placed on the lower half casing on which the magnetic tape reels have been mounted. The upper and lower half casings thus positioned are conveyed on the production line to a subsequent manufacturing station, at which the upper and lower half casings are fixedly secured together.

In this operation, a leaf spring having a large deflection creates the following difficulty. Specifically, when the upper half casing is temporarily placed on the lower half casing, the elasticity of the leaf spring on the magnetic tape reels urges the upper half casing so as to raise the upper half casing above the lower half casing, so that the upper half casing may be displaced, or even completely separated, from the lower half casing. Thus, it is difficult to combine the upper half casing with the lower half casing with high accuracy.

The above-described difficulties may be eliminated by decreasing the deflection of the leaf spring, i.e., by using a leaf spring having a small depression force. However, a magnetic tape cassette with such a leaf spring is still disadvantageous. For example, when the cassette is loaded into a signal recording and reproducing device, the drive shafts of the device are inserted into the cassette from below and are engaged with the magnetic tape reels. In this operation, the drive shafts may push upwardly on the magnetic tape reels such that the drive shafts are not engaged with the tape reels. Furthermore, the drive shafts may disengage the magnetic tape reels during operation.

In view of the foregoing, an object of this invention is to provide a magnetic tape cassette in which, when the cassette is assembled or stored, the leaf spring has a relatively small elastic deflection, thus lightly depressing the magnetic tape reels, and when the cassette is loaded into a signal recording and reproducing device, the leaf spring has a sufficiently high spring pressure to allow the drive shafts of the signal recording and reproducing device to positively engage the magnetic tape reels.

SUMMARY OF THE INVENTION

The foregoing object of the invention has been achieved by a magnetic tape cassette according to the present invention which comprises: a casing formed by an upper half casing and a lower half casing, a pair of tape winding structures built into the cassette casing on which a magnetic tape has been wound, and a leaf spring secured to the inner surface of the top wall of the upper half casing to vertically depress the tape winding structures, in which, according to the invention, spring pressure varying means is provided on at least one of the upper half casing and the leaf spring so that, when the leaf spring is being deformed, the raised portions of the leaf spring partially abut the upper half casing, thereby to vary the spring pressure of the leaf spring.

In the inventive magnetic tape cassette, the spring pressure varying means comprises a pair of protrusions which extend toward the leaf spring from the inner surface of the upper half casing at positions located between the fixing portion and two free end portions of the leaf spring. As the leaf spring is bent, the protrusions abut the arms of the leaf spring.

DETAILED DESCRIPTION OF THE PREFERRED EMBODIMENTS

Preferred embodiments of this invention will be described with reference to the accompanying drawings.

Figure 1:
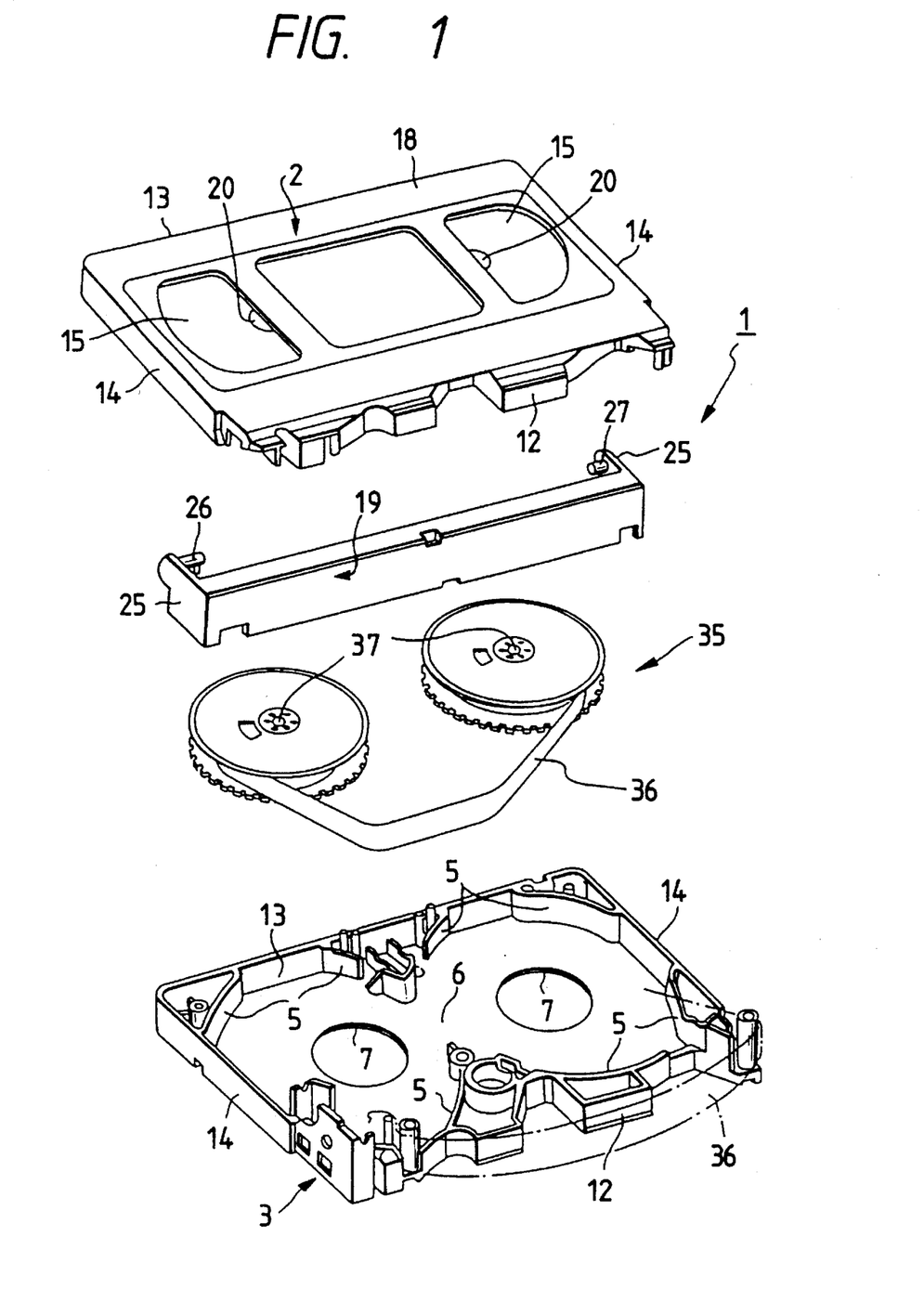
FIG. 1 is an exploded perspective view of a first embodiment of a magnetic tape cassette according to the invention.
Figure 2:
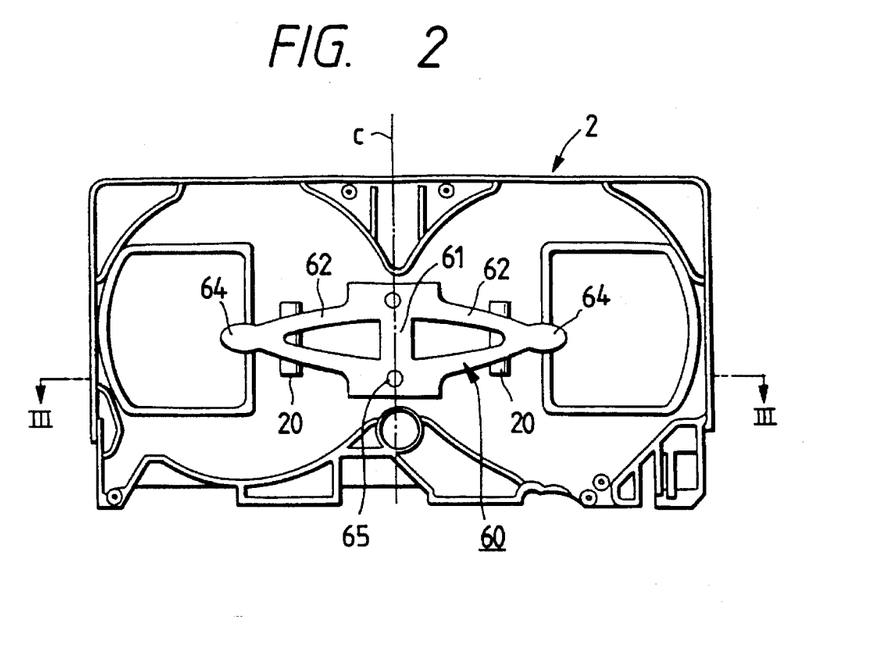
FIG. 2 is a plan view showing the interior of the upper half casing of the magnetic tape cassette according to the invention, as shown in FIG. 1.
Figure 3:
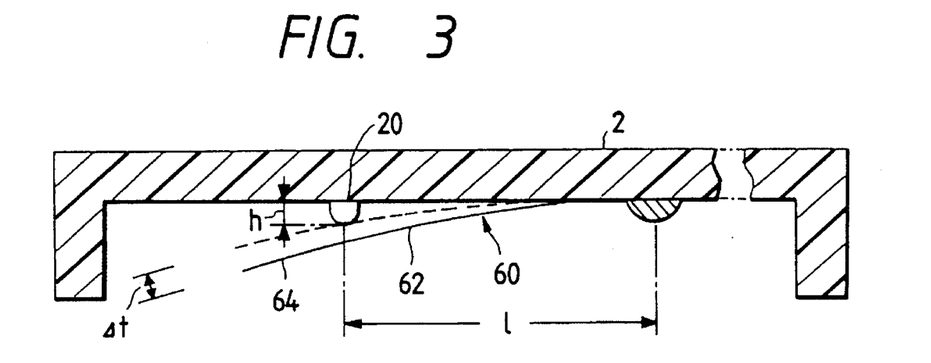
FIG. 3 is a fragmentary sectional view taken along line III—III in FIG. 2.

In FIGS. 1, 2 and 3, parts corresponding functionally to those which have been described with reference to FIGS. 10 and 11 (the conventional tape cassette) are designated by the same reference numerals or characters.

As shown in FIG. 1, the magnetic tape cassette includes a cassette casing formed by an upper half casing 2 and a lower half casing 3, and a pair of magnetic tape reels 35 on which a magnetic tape 36 has been wound. The cassette casing has tape lead-out openings in its front wall which are closed with a guard panel 19.

The upper half casing 2 has substantially a box-like shape. Specifically, the casing 2 has a rectangular top wall 18 having windows, front and rear walls 12 and 13 which extend from the front and rear edges of the rectangular top wall 18, and right and left walls 14 and 14 which extend from the right and left edges of the rectangular top walls 18. The upper half casing 2 is formed by injection molding. Transparent window plates 15 are fitted in the windows of the upper half casing 2 by welding.

A leaf spring 60 is fixedly secured to the center of the inner surface of the top wall of the upper half casing 2 so as to urge the magnetic tape reels 35 downwardly (i.e., towards the lower half casing 3). The leaf spring 60 has substantially the same configuration as the leaf spring of the above-described conventional tape cassette. The leaf spring 60 is made of a metal plate having a thickness less than that of the conventional one. The leaf spring 60 has end portions, e.g., free end portions 64 shown in FIG. 2, which abut protrusions 37 formed on the magnetic tape reels 35 at the centers thereof, respectively.

The lower half casing 3, similarly to the upper half casing 3, has a substantially box-like shape. Specifically, the lower half casing 3 includes a rectangular bottom wall 6, front and rear walls 12 and 13 which extend from the front and rear edges of the rectangular bottom wall 6, and right and left walls 14 and 14 which extend from the right and left edges of the rectangular bottom wall 6. The rectangular bottom wall 6 has shaft insertion openings 7 through which the drive shafts of a signal recording and reproducing device (or a VTR) are inserted into the hubs of the magnetic tape reels 35.

The cassette casing has partition walls 5 which extend from the top wall 18 and the bottom wall 6 to form two circles surrounding the magnetic tape reels 35 to suppress the horizontal displacement of the reels 35. The cassette casing has numerous other components which, for clarity, are not illustrated.

The upper and lower half casings 2 and 3 are made, for example, of ABS resin, and the magnetic tape reels 35 including the protrusions 37 are made of, for example, polystyrene (GPPS) resin, which is generally employed for molding.

A feature of the above-described first embodiment of the invention is that the leaf spring 60 engages, as it is deflected, spring pressure varying means (described below) provided on the upper half casing so that the depression forces of both free end portions 64 are varied. That is, the leaf spring 60, as shown in FIG. 2, has a fixing portion 61 at its center, and right and left arms 62 extending from the fixing portion 61. The fixing portion 61 of the leaf spring 60 is fixedly secured to the upper half casing 2 along the central axis C.

More specifically, the fixing portion 61 of the leaf spring 60 has holes which receive protrusions 65 formed on the upper half casing 2. Thereafter, the end portions of the protrusions 65 are fused by ultrasonic welding, so that the leaf spring 60 is fixedly secured to the upper half casing 2. In this operation, the arms 62 of the leaf spring 60 are positioned so as to be able to abut the spring pressure varying means (described in detail below).

In this embodiment of the invention, the spring pressure varying means comprises rib-shaped protrusions 20 formed on the inner surface of the top wall of the upper half casing 2. Specifically, one of the protrusions 20 is located between the fixing portion 61 of the leaf spring 60 and one of the free end portions 64, and another protrusion is located between the fixing portion 61 and the second free end portion 64.

The leaf spring 60 will be described in more detail below. As shown in FIG. 3, the leaf spring 60 has right and left arms 62 which symmetrically extend from the central fixing portion 61 and are curved obliquely downwardly in the cassette. Before the cassette is assembled, the arms 61 are spaced apart from the protrusions 20, as indicated by the straight lines in FIG. 3. The elasticity of the leaf spring 60 is set such that, when the upper half casing 2 with the leaf spring 60 is placed from above on the lower half casing 3 having the magnetic tape reels 35 (e.g., as shown in FIG. 1) during cassette assembly, the leaf spring 60 is elastically deformed by being depressed only by the weight of the upper half casing 2. More specifically, the amount of deformation is less than that indicated by the broken line in FIG. 3. That is, the arm 64 is not in contact with the protrusion 20.

Hence, the upper half casing 2 and the lower half casing 3 are not separated by the elastic force of the leaf spring 60 when conveyed to a subsequent manufacturing station, and at the manufacturing station the half casings 2 and 3 can be positively secured together with high accuracy. That is, the problem during assembly of the conventional magnetic tape cassette of the upper half casing being held insecurely above the lower half casing when these two half casings are moved to the subsequent manufacturing station is eliminated. Accordingly, the problem of the upper half casing not being held in position or falling off the lower half casing is also prevented.

In the cassette thus assembled, the free end portions 61 of the leaf spring 60 depress the protrusions 37 of the magnetic tape reels 35 with elastic forces. The elastic forces of the free end portions 61 are provided by the deflection of the arms 62 in a range of Δt, as shown in FIG. 3. The elastic forces facilitate the cassette assembly, as described above, and permit the leaf spring to have a so-called "soft elastic displacement range".

If, in the above-described case, relatively weak elastic forces depress the magnetic tape reels, problems may arise. Specifically, when the magnetic tape cassette is loaded in the signal recording and reproducing device, if the drive shafts are not smoothly inserted into the magnetic tape reels, the reels can be moved upwardly because the elastic forces are low. That is, the drive shafts cannot be inserted into the reels.

To overcome the above-described difficulty, in the embodiment according to the invention, the spring pressure varying means (e.g., the protrusions 20) is provided. The protrusions 20 provide elastic forces great enough to positively depress the reels. Each of the protrusions 20 is positioned to be able to abut the respective arm 62 at the center thereof. Therefore, the arm 62 contacting the protrusion 20 makes the effective length of the arm 62 substantially shorter, thereby to increase the depression force of the free end portion 64. Thus, the magnetic tape reels are suitably depressed with the depression forces increased, so that the reels are satisfactorily engaged with the drive shafts of the signal recording and reproducing device.

Figure 4:
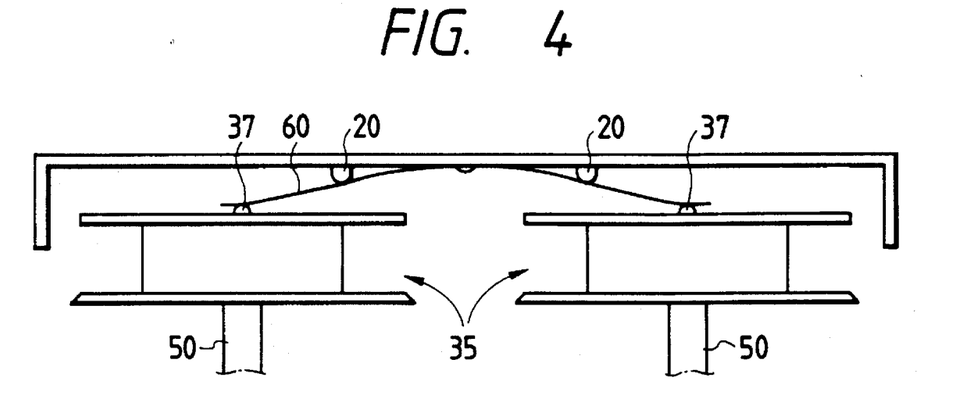
FIG. 4 is a fragmentary sectional view showing a state of a leaf spring in the cassette when the cassette is in use.

When, as shown in FIG. 4, the drive shafts 50 of the signal recording and reproducing device are inserted into the hubs of the magnetic tape reels 35, the reels 35 are pushed slightly upwardly. As a result, the leaf spring 60, abutting the protrusions 20, is further elastically deformed with the protrusions 20 serving as fulcra. Therefore, the arms of the leaf spring are substantially decreased in their effective length, so that the elastic forces thereof are increased. That is, the leaf spring provides elastic forces so as to be operable in a so-called "hard elastic displacement range".

In one example of the above-described magnetic tape cassette, the leaf spring 60 may have, for example, a spring constant (E) of 0.021 kg/mm, and the protrusions 20 have a height (h) of 1.0 mm, and be spaced by a distance (l) of 30 mm from the fixing portion 61.

Figure 5:
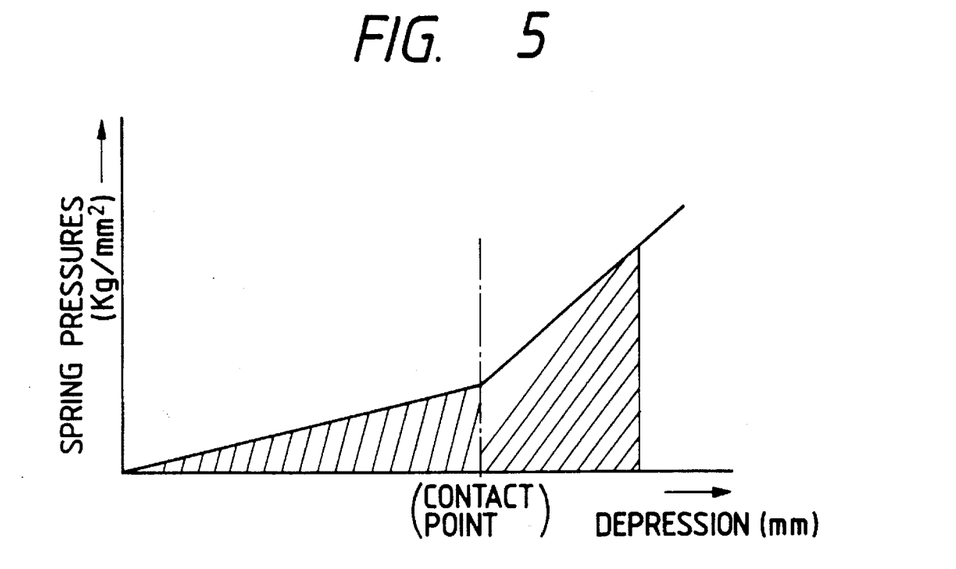
FIG. 5 is a graphical representation of a spring characteristic of the leaf spring.

FIG. 5 shows the spring characteristic of the leaf spring 60. More specifically, the spring pressure (kg/mm$^2$) is plotted on the vertical axis, and the amount of depression of the magnetic tape reels acting on the spring is plotted on the horizontal axis. The spring pressure is selected so that, when the cassette is in use, the spring pressure is in a range of from 140 g to 180 g.

As shown in FIG. 5, the spring pressure of the leaf spring changes abruptly when the arm 62 is brought into contact with the protrusion 20. That is, when the magnetic tape reels are depressed, the spring pressure provided allows the leaf spring 60 to act in the soft displacement range until the arms 62 are brought into contact with the protrusions 20. When the arms 61 have been brought into contact with the protrusions 20, the spring pressure allows the leaf spring 60 to act in the hard elastic displacement range.

When, in the magnetic tape cassette thus constructed, the leaf spring is greatly bent while being pushed, the arms of the leaf spring are brought into contact with the protrusions. As a result, the protrusions 20 serve as fulcra, so that the arms 62 are substantially decreased in length, thus increasing the spring pressure. Consequently, the cassette of the invention is advantageous since the leaf spring can have a reduced thickness as compared to the conventional cassette.

Figure 6:
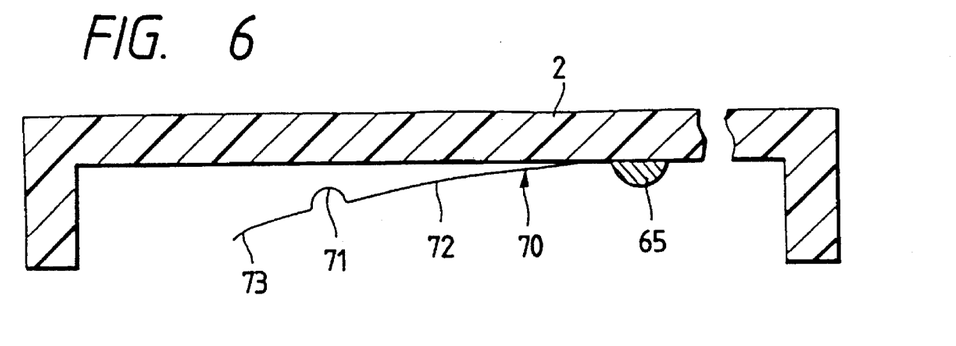
FIG. 6 is a fragmentary sectional view showing a second embodiment of the magnetic tape cassette according to the invention taken along line VI—VI in FIG. 12.

FIGS. 6 and 11 illustrate a second embodiment of the magnetic tape cassette according to the invention.

In the second embodiment, a spring pressure varying means comprises protrusions 71 formed on the arms 72 of a leaf spring 70 formed of metal. Similarly to the first embodiment shown in FIGS. 1 through 4, the leaf spring 70 has a fixing portion at its center, and the right and left arms 72 extend from the fixing portion. The fixing portion is secured to the upper half casing 2 by protrusions 65 formed on the inner surface of the top wall of the upper half casing 2. The arms 72 have the aforementioned protrusions 71 between the protrusions 65 on the upper half casing and the free end portions 73 of the leaf spring 70, such that the protrusions 71 extend towards the upper half casing 2.

The arms 72 of the leaf spring 70 act in the soft elastic displacement range until the protrusions are brought into contact with the upper half casing 2, and act in the hard elastic displacement range after the protrusions 71 have been brought into contact with the upper half casing 2. In FIG. 6, the protrusions 71 are semi-circular in section. However, the invention is not limited thereto or thereby. That is, the configuration of the protrusions 71 may be changed freely.

Figure 7:
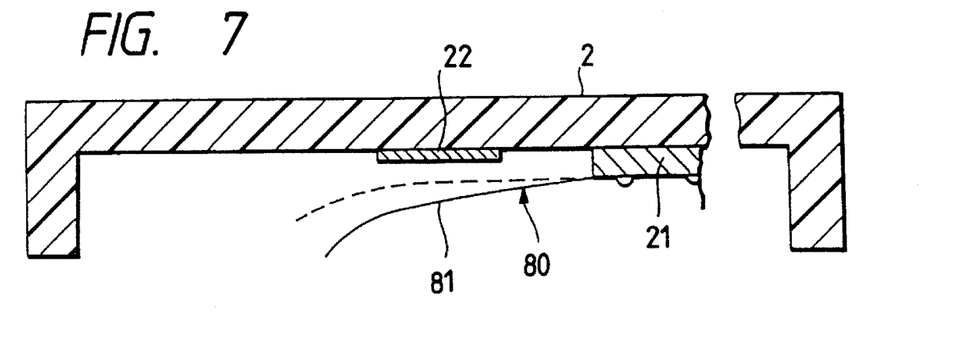
FIG. 7 is a fragmentary sectional view showing a third embodiment of magnetic tape cassette according to the invention taken along line VII—VII in FIG. 13.
Figure 8:
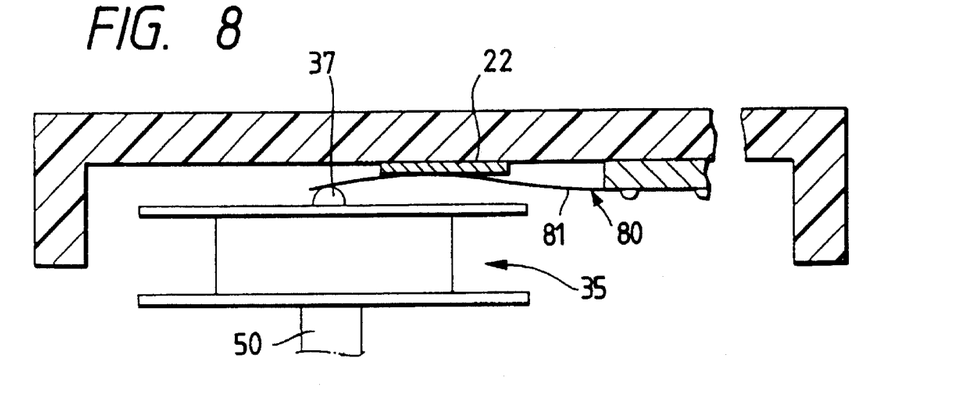
FIG. 8 is a fragmentary sectional view showing a state of the leaf spring in the cassette shown in FIG. 7 when the cassette is in use.
Figure 12:
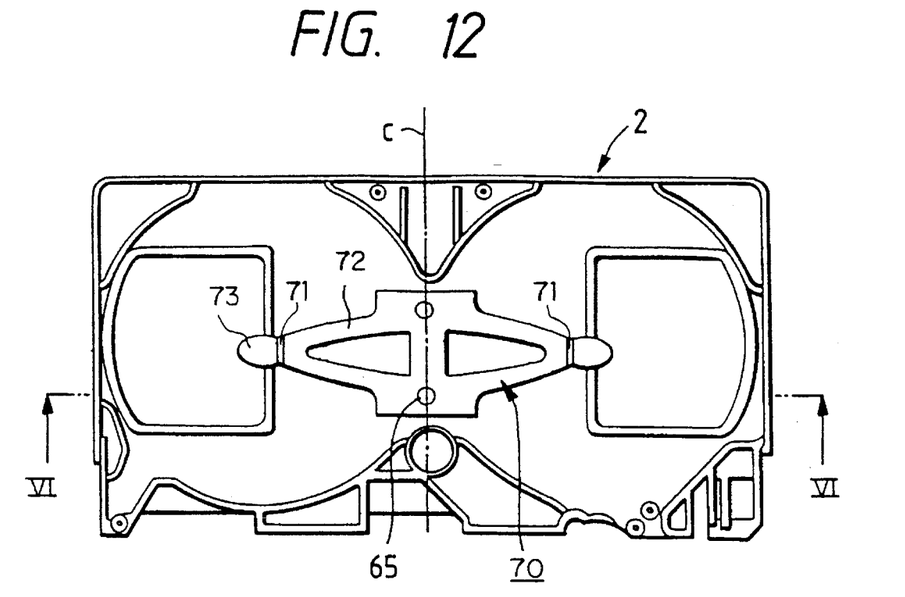
FIG. 12 is a plan view illustrating the second embodiment.
Figure 13:
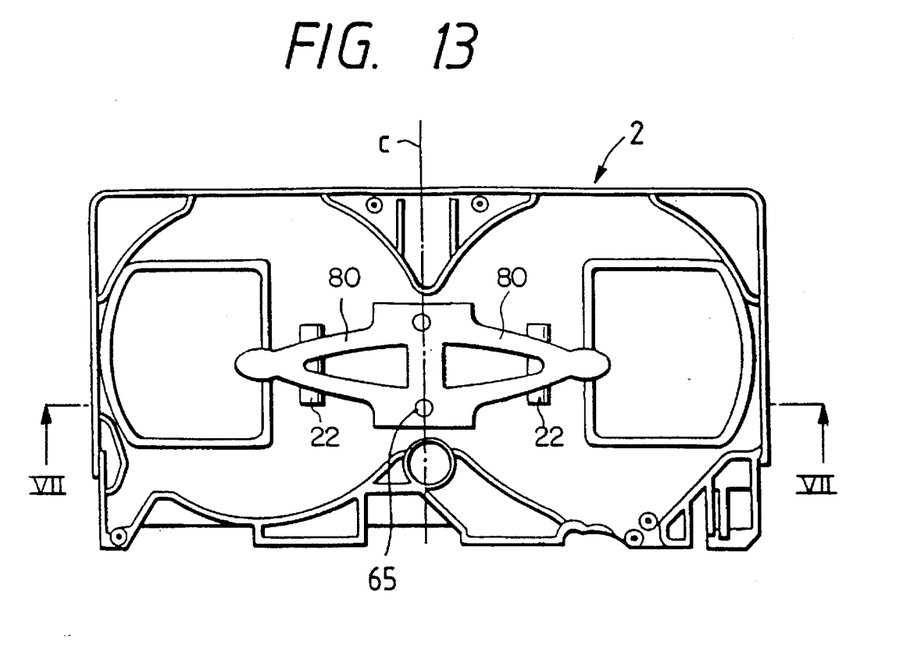
FIG. 13 is a plan view illustrating the third embodiment.

FIGS. 12, 7 and 8 show a third embodiment of the magnetic tape cassette 1 according to the invention.

FIG. 7 shows the leaf spring in a state in which the magnetic tape cassette is assembled or stored. FIG. 8 shows the leaf spring in a state in which the cassette is loaded in the signal recording and reproducing device.

As shown in FIG. 7, the leaf spring 80 at its center has a fixing portion, and right and left arms 81 (only one arm shown) extend from the fixing portion. The fixing portion is secured to spring pressure varying means, e.g., a seat-like supporting stand 21 which is positioned in the center on the inner surface of the top wall of the upper half casing such that the stand 21 protrudes towards the lower half casing. The right and left arms 81 of the leaf spring, as indicated by the solid line in FIG. 7, are appropriately curved and directed obliquely downwardly extending from the supporting stand. That is, each of the arms 81 is arranged to act in a soft elastic displacement range from the position where each arm is curved to the position where it extends in the direction of a line tangential to the supporting stand.

On the other hand, half casing protrusions 22 (for convenience, only one protrusion is shown) are formed on the upper half casing 2 such that each of the protrusions is positioned between the free end portion and the base portion of the respective arm and is slightly protruded towards the lower half casing so that the protrusion can abut the arm 81. The heights of the supporting stand 21 and the half casing protrusions 22 are determined so that the height of the stand 21 is equal to or larger than that of the protrusions 22.

The upper half casing 2, to which the leaf spring 80 has been secured in the above-described manner, is placed over the lower half casing, as shown in FIG. 7, when assembled. In this operation, the leaf spring 80 is pushed by the weight of the upper half casing 2, so that the arms 81 are deformed until the leaf spring comes to a position substantially in the direction of a line tangential to the supporting stand 21, as indicated by the broken line. The initial deformation of the arms is in the soft elastic displacement range. Therefore, the upper half casing 2 is held in abutment against the lower half casing 3, (i.e., the upper half casing 2 is not separated from the lower half casing 3), when conveyed. Finally, the upper and lower half casings 2 and 3 are secured together to form the cassette with the leaf spring held elastically in the above-described manner.

When the magnetic tape cassette thus manufactured is loaded in the signal recording and reproducing device, the leaf spring 80 is deformed as shown in FIG. 8. That is, when the drive shafts 50 of the signal recording and reproducing device inserted into the cassette raise the magnetic tape reels, the free end portions of the leaf spring are further depressed to push the arms 81 against the half casing protrusions 22. As a result, the leaf spring 80 pushes the magnetic tape reels 50 while the leaf spring acts in the hard elastic displacement range, so that the magnetic tape reels 35 are positively engaged with the drive shafts 50.

Figure 9:
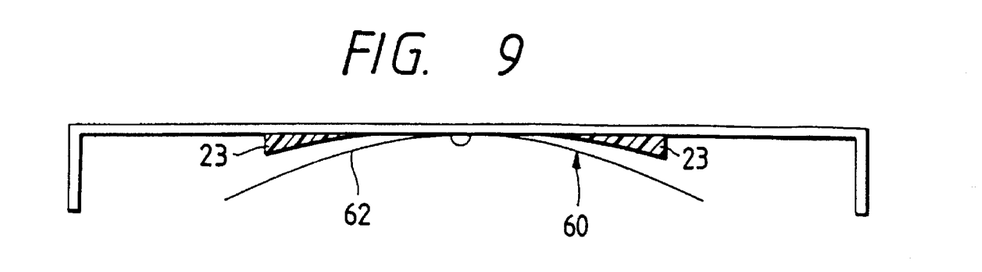
FIG. 9 is a fragmentary sectional view showing a modification of the magnetic tape cassette according to the invention.

FIG. 9 shows a modification of the magnetic tape cassette described above and illustrated in FIGS. 7 and 8.

Specifically, the upper half casing 2 has a rib-shaped protrusion 23 having a wedge-like shape in cross-section. The rib-shaped protrusion 23 is arranged on the inner surface of the top wall of the upper half casing 2 such that the protrusion 23 is symmetrical with the leaf spring 60. Preferably, the surface of the rib-shaped protrusion 23 which is brought into contact with the arms 62 has a curvature substantially equal to that of the arms 62.

In the magnetic tape cassette thus modified, a larger part of the leaf spring is supported by the rib-shaped protrusion 23 when the leaf spring is initially brought into contact with the protrusion.

While several embodiments of the invention have been described above, the invention is not limited thereto or thereby. For instance, the specific features of above-described embodiments may be suitably combined to provide magnetic tape cassettes.

Additionally, the preferred embodiments of the invention described above are directed to magnetic tape cassettes for VHS system VTRs. However, the invention is not limited thereto or thereby. That is, the technical concept of the invention may be effectively applied to other magnetic tape cassettes such as those for Beta format system VTRs and those for 8-mm system VTRs.

As was described above, in the magnetic tape cassette according to the invention, the leaf spring is fixedly secured to the inner surface of the top wall of the upper half casing, and the spring pressure varying means is provided on at least one of the upper half casing and leaf spring, which, while the leaf spring is being deformed, causes the deformed portions of the leaf spring to abut the upper half casing.

Hence, while the leaf spring of the magnetic tape cassette is decreased in thickness, the spring pressure varying means eliminates the difficulty accompanying the conventional magnetic tape cassette that the leaf spring obstructs cassette assembly when the leaf spring is bent greatly. More specifically, the spring pressure varying means changes the depression force of the leaf spring. Hence, the magnetic tape cassette of the invention can be assembled smoothly. In the magnetic tape cassette of the invention, the leaf spring has an elastic force as strong as that of the conventional magnetic tape cassette.

Furthermore, according to the invention, the thickness of the leaf spring can be decreased without reducing the mechanical strength of the magnetic tape reels, thereby contributing to reducing the manufacturing cost of the magnetic tape cassette.

What is claimed is:

1. A magnetic tape cassette, comprising:

a cassette casing comprising a first half casing and a second half casing;

a pair of tape winding members, received in said cassette casing, for winding a magnetic tape thereon;

a leaf spring secured to an inner surface of a first wall of said first half casing and arranged to depress said tape winding members in a direction away from said first half casing; and means, provided on said first half casing, for varying a force of said leaf spring such that, when said leaf spring is being deformed by said tape winding members which are pushed by a drive device in a direction toward said first half casing during use, at least intermediate portions of said leaf spring are caused to abut said varying means on said first half casing thereby to vary the spring force of said leaf spring, said intermediate portions being separated from said first half casing when said tape winding members are not pushed.

2. A magnetic tape cassette according to claim 1, wherein said leaf spring is made of metal.

3. A magnetic tape cassette as claimed in claim 1, wherein said leaf spring comprises a fixing portion, and first and second arms symmetrically extending from said fixing portion and having a curvature.

4. A magnetic tap cassette as claimed in claim 1, wherein said first half casing and said second half casing are not separated by an elastic force of said leaf spring during manufacturing.

5. A magnetic tape cassette as claimed in claim 1, wherein said leaf spring comprises a fixing portion and a plurality of free end portions, and wherein said spring force varying means comprises a plurality of protrusions extending toward said leaf spring from the inner surface of said first half casing at positions located between the fixing portion and the plurality of free end portions of said leaf spring, respectively.

6. A magnetic tape cassette as claimed in claim 5, wherein said leaf spring comprises a pair of arms, and said spring pressure varying means comprises means for separating intermediate portions of said pair of arms of said leaf spring from the inner wall of said first half casing when said magnetic tape cassette is not in use, and for abutting said intermediate portions against the inner surface of said first half casing when said magnetic tape cassette is in use.

7. A magnetic tape cassette as claimed in claim 5, wherein said protrusions have a rectangular shape in cross-section.

8. A magnetic tape cassette as claimed in claim 5, further comprising a supporting stand positioned on the inner surface of said first half casing such that said supporting stand protrudes towards said second half casing, wherein a height of said supporting stand is no less than a height of said protrusions.

9. A magnetic tape cassette as claimed in claim 5, wherein said protrusions have a wedge-like shape in cross-section.

10. A magnetic tape cassette as claimed in claim 5, wherein said protrusions are arranged on said first half casing such that said protrusions are arranged symmetrically with said leaf spring.

11. A magnetic tape cassette as claimed in claim 5, wherein a surface of said protrusions brought into contact with said arms has a curvature substantially equal to that of said arms.

12. A tape cassette, comprising:

a housing including a first half casing and a second half casing;

means, received in said housing, for winding a tape thereon;

means, secured to said first half casing, for depressing said tape winding means in a direction away from said first half casing; and means, provided on said first half casing, for varying a force of said depressing means such that, as said depressing means is being deformed by said tape winding means when said tape winding means is pushed by a drive device in a direction toward said first half casing, at least intermediate portions of said depressing means are caused to abut said varying means on said first half casing, thereby to vary the force of said depressing means, said intermediate portions being separated from said first half casing when said tape winding members are not pushed in a direction toward said first half casing by a drive device.

13. A magnetic tape cassette, comprising:

a cassette casing comprising a first half casing and a second half casing;

a pair of tape winding members, received in said cassette casing, for winding a magnetic tape thereon;

a leaf spring, having free ends, secured at a fixing portion to an inner surface of a first wall of said first half casing and arranged to depress said tape winding members in a direction away from said first half casing; and a plurality of protrusions formed on said first half casing and extending towards said leaf spring at such that, when said leaf spring is being deformed by said tape winding members which are pushed in a direction toward said first half casing by a drive device during use, intermediate portions of said leaf spring which are located between the fixing portion and the free ends of said leaf spring, are caused to abut on said protrusions thereby to vary the spring force of said leaf spring, said intermediate portions being separated from said protrusions when said tape winding members are not pushed.

\* \* \* \* \*